United States Patent
Lee

(10) Patent No.: US 7,573,953 B2
(45) Date of Patent: *Aug. 11, 2009

(54) METHOD AND APPARATUS FOR ESTIMATING SFO IN DIGITAL RECEIVER, AND METHOD AND APPARATUS FOR COMPENSATING FOR SAMPLING FREQUENCY USING THE ESTIMATED SFO IN THE DIGITAL RECEIVER

(75) Inventor: Dong Geun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 573 days.

This patent is subject to a terminal disclaimer.

(21) Appl. No.: 11/205,561

(22) Filed: Aug. 17, 2005

(65) Prior Publication Data

US 2006/0039507 A1 Feb. 23, 2006

(51) Int. Cl.
 *H04L 27/00* (2006.01)
(52) U.S. Cl. .................... 375/326; 375/355
(58) Field of Classification Search ......... 375/354–355, 375/371, 373, 376, 316, 326
See application file for complete search history.

(56) References Cited

U.S. PATENT DOCUMENTS

| 5,343,498 | A | * | 8/1994 | Toy et al. ............... 375/259 |
| 5,416,800 | A | * | 5/1995 | Frank ................... 375/239 |
| 6,459,745 | B1 | * | 10/2002 | Moose et al. ............ 375/355 |
| 6,577,698 | B1 | | 6/2003 | Boonen et al. |
| 6,683,903 | B1 | * | 1/2004 | Wang ................... 375/130 |
| 7,304,545 | B1 | * | 12/2007 | Sutardja et al. ........... 331/10 |
| 2007/0116159 | A1 | * | 5/2007 | Popper ................. 375/344 |

FOREIGN PATENT DOCUMENTS

EP 1193934 A2 * 4/2002

OTHER PUBLICATIONS

Yong-Jung Kim, et. al. "A new fast symbol timing recovery lagorithm for OFDM system." Aug. 1998.
Dong-Seog Han, et. al. "On the syncronization of MC-CDMA system for indoor wireless communications." Sep. 19-22, 1999.
Stuber et. al. "Broadband MIMO-OFDM Wireless Communications"—vol. 92, No. 2, Proceedings of the IEEE, New York, U.S. Feb. 2, 2004.

* cited by examiner

*Primary Examiner*—Chieh M. Fan
*Assistant Examiner*—Freshteh N Aghdam
(74) *Attorney, Agent, or Firm*—Lee, Hong, Degerman, Kang & Waimey

(57) ABSTRACT

A sampling frequency offset (SFO) estimation method for use in a digital receiver to estimate a correct SFO is disclosed. The method for estimating the SFO in the digital receiver includes the steps of (a) receiving an estimated phase, and comparing a magnitude of the estimated phase with that of a predetermined standard deviation; (b) if the magnitude of the estimated phase is greater than that of the predetermined standard deviation, compulsorily setting the estimated phase to zero, and storing the estimated phase of zero; and (c) calculating an SFO value using the stored phase. Therefore, the method performs zero-forcing on a phase overshoot caused by a ghost, such that a correct SFO can be estimated in the tracking mode.

19 Claims, 8 Drawing Sheets

FIG. 1
Prior Art

| Continual pilot carrier positions (index number k) | |
|---|---|
| 2k mode | 8k mode |
| 0 48 54 87 141 156 192 201 255 279 282 333 432 450<br>483 525 531 618 636 714 759 765 780 804 873 888 918<br>939 942 969 984 1050 1101 1107 1110 1137 1140 1146<br>1206 1269 1323 1377 1491 1683 1704 | 0 48 54 87 141 156 192 201 255 279 282 333 432 450<br>483 525 531 618 636 714 759 765 780 804 873 888<br>918 939 942 969 984 1050 1101 1107 1110 1137 1140<br>1146 1206 1269 1323 1377 1491 1683 1752 1758<br>1791 1845 1860 1896 1905 1959 1983 1986 2037 2136<br>2154 2187 2229 2235 2322 2340 2418 2463 2469 2484<br>2508 2577 2592 2622 2643 2646 2673 2688 2754 2805<br>2811 2814 2841 2844 2850 2910 2973 3027 3081 3195<br>3387 3408 3456 3462 3495 3549 3564 3600 3609 3663<br>3687 3680 3741 3840 3858 3851 3933 3939 4026 4044<br>4122 4167 4173 4188 4212 4281 4296 4326 4347 4350<br>4377 4458 4509 4515 4518 4545 4548 4554 4614<br>4677 4737 4785 4899 5091 5112 5160 5166 5199 6253<br>5268 5304 5313 5367 5391 5394 5445 5544 5562 5595<br>5637 5643 5730 5748 5826 5871 5877 5892 5916 5985<br>6000 6030 6051 6054 6081 6096 6162 6213 6219 6222<br>6249 6252 6258 6318 6381 6435 6489 6603 6795 6816 |

(a)

(b)

US 7,573,953 B2

METHOD AND APPARATUS FOR ESTIMATING SFO IN DIGITAL RECEIVER, AND METHOD AND APPARATUS FOR COMPENSATING FOR SAMPLING FREQUENCY USING THE ESTIMATED SFO IN THE DIGITAL RECEIVER

CROSS REFERENCE TO RELATED APPLICATIONS

Pursuant to 35 U.S.C. § 119(a), this application claims the benefit of earlier filing date and right of priority to Korean Patent Application No. 10-2004-0065129, filed on Aug. 18, 2004, the content of which is hereby incorporated by reference herein in its entirety.

BACKGROUND OF THE INVENTION

1. Field of the Invention

The present invention relates to a digital receiver, and more particularly, to a method and apparatus for estimating an SFO (Sampling Frequency Offset) applicable to the digital receiver, and an apparatus for compensating for a sampling frequency using the estimated SFO.

2. Discussion of the Related Art

Generally, a DVB-T (Digital Video Broadcasting-Terrestrial) system acting as the European transmission standard for a terrestrial digital TV has generally selected an OFDM (Orthogonal Frequency Division Multiplexing) transmission scheme. It is well known in the art that the OFDM transmission scheme has very strong resistance to channel distortion caused by multiple paths (also called a multi-path) in a wireless broadband broadcast system.

On the other hand, the OFDM transmission scheme has very weak resistance to synchronization. Therefore, if accurate synchronization is not established between a transmitter and a receiver, distortion of a reception signal occurs. In order to solve the above-mentioned problem, many developers have conducted intensive research into the improved OFDM transmission scheme.

Particularly, if the receiver does not correctly perform sampling synchronization, an ISI (inter Symbol Interference) and a constellation rotation may occur in a reception signal, such that the receiver cannot demodulate the reception signal.

In order to solve the above-mentioned problem, there has been newly proposed a method for estimating an SFO (Sampling Frequency Offset) using a CP (Continual Pilot) shown in FIG. 1.

FIG. 1 shows general CP positions. As shown in FIG. 1, 45 pilots are employed during a 2 k mode, and 177 pilots are employed during an 8 k mode.

For example, in the case of the 2 k mode, a total of 1705 data subcarriers are present in one OFDM symbol interval. A pilot is located at each of subcarrier positions, for example, 0-th, 48-th, and 54-th subcarrier positions, etc. In this case, the pilot is positioned at the same subcarrier positions as the above subcarrier positions in the next OFDM symbol, such that the pilot will be referred to as a Continual Pilot (CP).

A method for calculating the SFO using the above-mentioned CP information shown in FIG. 1 is shown in FIG. 2.

FIG. 2 is a block diagram illustrating a conventional SFO estimation system.

The above-mentioned conventional SFO estimation method will hereinafter be described with reference to FIG. 2. Firstly, the SFO estimation system receives a single signal $Z_{l,k}$. The $Z_{l,k}$ signal is indicative of a k-th subcarrier in a first OFDM symbol. For example, in the case of the 2 k mode shown in FIG. 1, the $Z_{l,k}$ signal is indicative of one pilot from among a plurality of pilots (i.e., 0-th, 48-th, and 53-th symbols, etc.) in the first OFDM symbol.

The $Z_{l,k}$ signal is converted into another signal of $Z_{l-1,k}$ via a delay 10. The $Z_{l-1,k}$ signal is converted into a conjugate root signal of $Z^*_{l-1,k}$ via a conjugate calculator 20.

Correlation between the $Z_{l,k}$ signal and the $Z^*_{l-1,k}$ signal is performed by a multiplier 30, such that the multiplier 30 outputs a phase information signal of $x_{l,k}$. By the following equation 1 performed by a phase estimator 40, the phase information signal of $x_{l,k}$ acquires a total of 45 phase data units in the case of the 2 k mode, and acquires a total of 177 phase data units in the case of the 8 k mode.

$$\tan^{-1} = \frac{\text{Re}(x_{l,k})}{\text{Im}(x_{l,k})} \qquad \text{[Equation 1]}$$

An SFO calculator 50 calculates a slope between phase data units using the phase data generated from the phase estimator 40, and calculates a mean slope, such that it calculates the SFO value.

The above-mentioned conventional SFO estimation method acquires correlation between two OFDM symbols, acquires a phase on the basis of the acquired correlation, and calculates a change rate of the acquired phase, such that it estimates the SFO value.

However, the above-mentioned SFO estimation method may incur irregular overshoots of the phase due to a deep fading phenomenon in a long ghost environment as shown in FIG. 3b, whereas it easily estimates the SFO because a phase change rate is constant in an AWGN (Additive White Gaussian Noise) environment as shown in FIG. 3a.

The above-mentioned irregular overshoots do not affect the SFO in an acquisition mode of a sampling frequency, but it greatly affects the SFO in a tracking mode of the sampling frequency as shown in FIG. 4.

FIG. 4 shows a plurality of SFO values estimated in acquisition and tracking modes of the sampling frequency. As shown in FIG. 4, it can be recognized that a jittering range increases if overshoots occur in the tracking mode.

In this manner, if the jittering range increases due to the overshoots in the tracking mode, the increased jittering range has a negative influence upon a method for compensating for a sampling frequency by estimating a correct SFO. Furthermore, assuming that an SFO of more than 400 ppm occurs in the 2 k mode of the long ghost environment or an SFO of more than 100 ppm occurs in the 8 k mode of the same long ghost environment, the conventional SFO estimation method has difficulty in correctly estimating the above-mentioned SFO values.

SUMMARY OF THE INVENTION

Accordingly, the present invention is directed to a method and apparatus for estimating an SFO in a digital receiver, and a method and apparatus for compensating for a sampling frequency using the estimated SFO.

An object of the present invention is to provide an SFO estimation method for efficiently estimating an SFO, and correctly estimating the SFO although the estimated SFO is transitioned to 400 ppm in a 2 k mode or 100 ppm in an 8 k mode.

Another object of the present invention is to provide an apparatus for compensating for a sampling frequency using the estimated SFO.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for estimating an SFO (Sampling Frequency Offset) in a digital receiver to perform sampling synchronization, comprises the steps of (a) receiving an estimated phase, and comparing a magnitude of the estimated phase with that of a predetermined standard deviation; (b) if the magnitude of the estimated phase is greater than that of the predetermined standard deviation, compulsorily setting the estimated phase to zero, and storing the estimated phase of zero; and (c) calculating an SFO value using the stored phase.

Preferably, the estimated phase is estimated using CP (Continual Pilot) information contained in a transmitted OFDM (Orthogonal Frequency Division Multiplexing) symbol.

Preferably, the step (a) for comparing the estimated phase with the predetermined standard deviation is executed when a current frequency estimation mode is equal to a tracking mode. Preferably, if the frequency estimation mode is not equal to the tracking mode, the estimated phase is stored in a buffer, the SFO is calculated using the stored estimated phase.

Preferably, the method further comprises the steps of: receiving the calculated SFO value, and comparing the received SFO value with an input SFO threshold value; if the calculated SFO value is higher than the SFO threshold value, re-calculating the SFO value using only a half pilot phase information.

Preferably, the half the pilot phase information does not include both-end information of an inverted pilot phase.

In another aspect of the present invention, there is provided an apparatus for estimating a sampling frequency offset (SFO) in a digital receiver to perform sampling synchronization, comprising a phase estimator for receiving phase information $x_{l,k}$, and generating an estimated phase; and an SFO calculator for receiving the estimated phase, comparing a magnitude of the estimated phase with that of a predetermined standard deviation, compulsorily setting the estimated phase to zero if the magnitude of the estimated phase is greater than that of the predetermined standard deviation, and calculating an SFO value.

In still another aspect of the present invention, there is provided a method for compensating for a sampling frequency in a digital receiver, comprising the steps of (a) extracting CP (Continual Pilot) information from a transmitted OFDM symbol; (b) estimating a phase using the extracted CP information, compulsorily setting the estimated phase to zero if a magnitude of the estimated phase is greater than that of a predetermined standard deviation, calculating a SFO (Sampling Frequency Offset) value, and re-calculating the SFO value using only a half a pilot phase if the calculated SFO value is higher than a predetermined threshold value; (c) accumulatively compensating for the calculated SFO value; and (d) outputting a signal for controlling a sampling frequency using the accumulatively-compensated SFO value.

Therefore, the present invention performs zero-forcing on a phase overshoot caused by a ghost, such that a correct SFO can be estimated in the tracking mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 shows general CP positions;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

Figure 5:
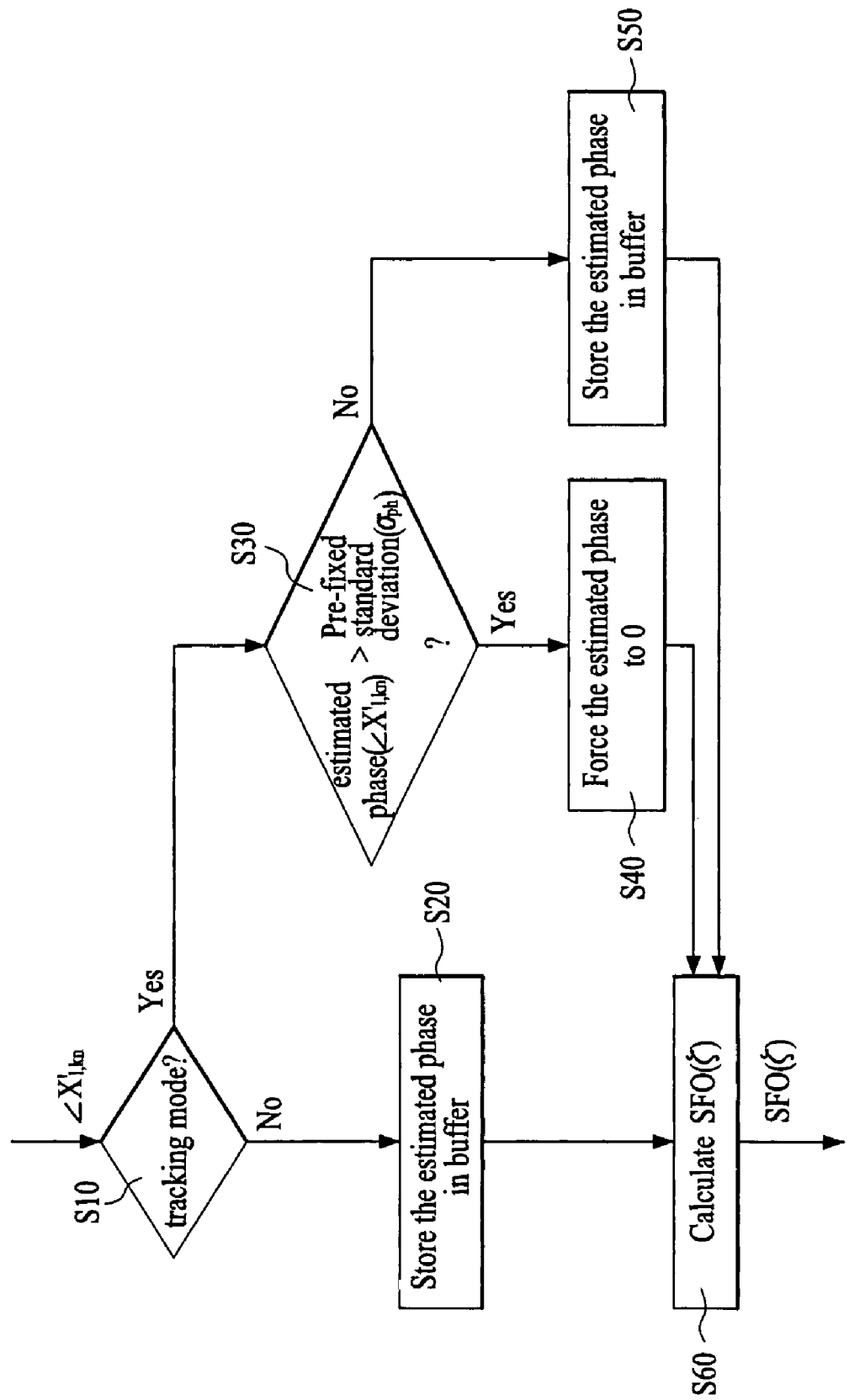
FIG. 5 is a flow chart illustrating an SFO estimation algorithm according to the present invention.

FIG. 5 is a flow chart illustrating an SFO estimation algorithm according to the present invention.

Figure 2:
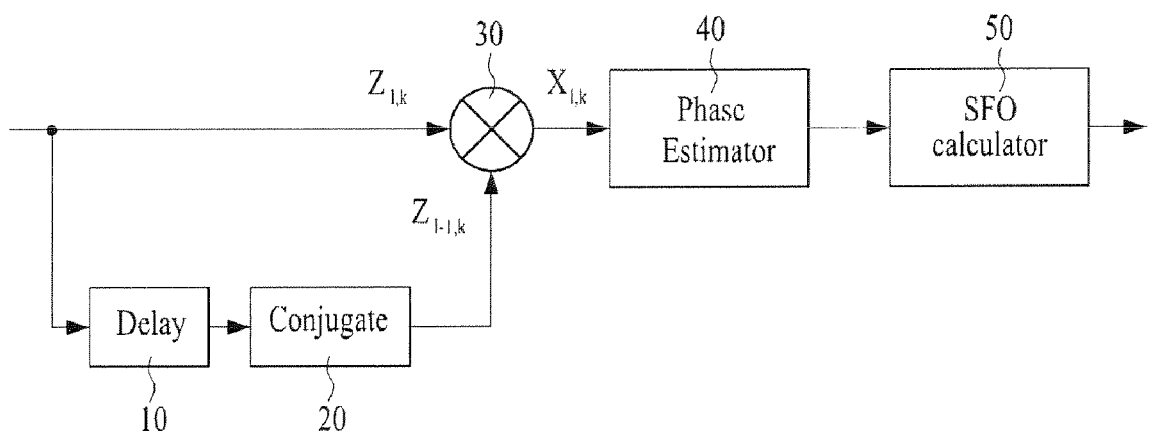
FIG. 2 is a block diagram illustrating a conventional SFO estimation system.
Figure 3:
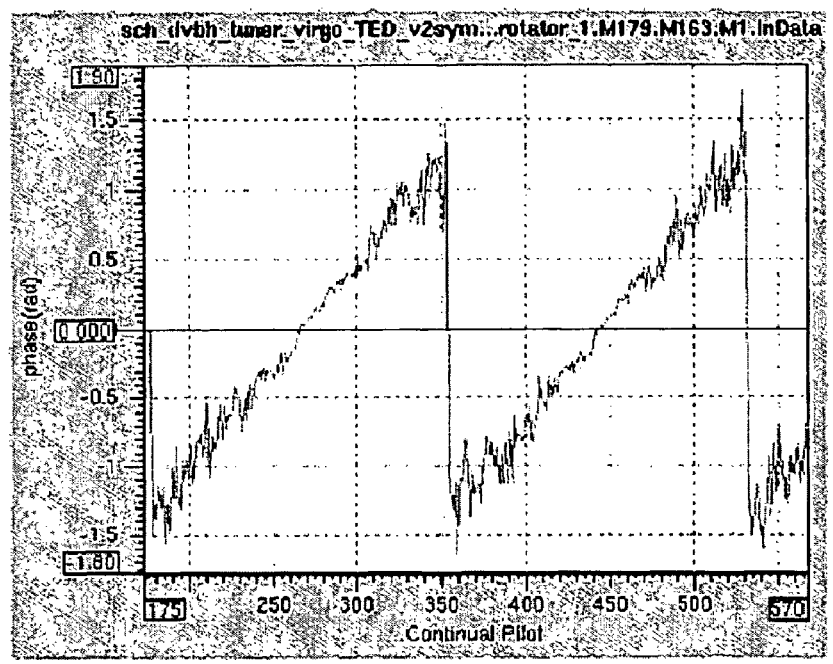
FIG. 3 shows phase variations calculated in the case of general AWGN and long ghost environments.
Figure 3:
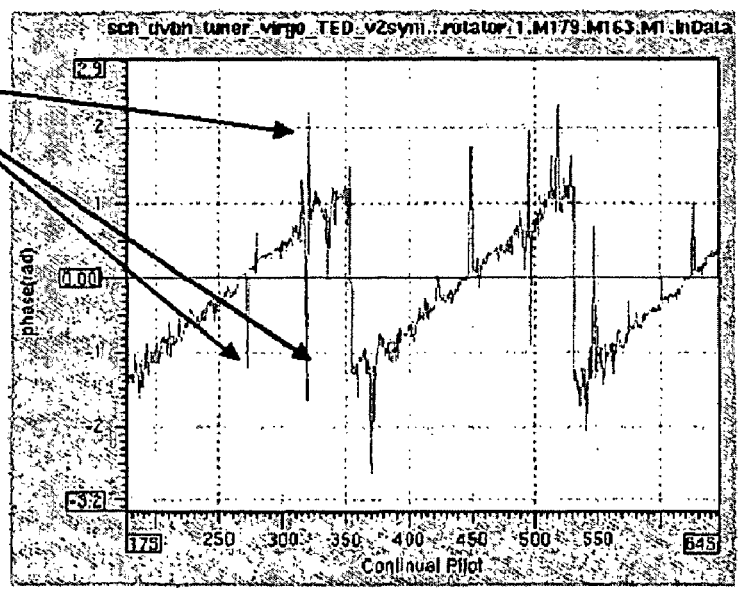

As shown in FIG. 5, an input estimation phase $\angle x'_{l,k_n}$ is indicative of a phase value estimated by the phase estimator 40 shown in FIG. 2. Therefore, it should be understood that the SFO estimation algorithm shown in FIG. 5 is performed by the SFO calculator 50.

If the SFO calculator 50 receives the estimated phase $\angle x'_{l,k_n}$, it determines whether a current frequency estimation mode is a tracking mode at step S10, because the overshoot caused by the deep fading greatly affects a desired SFO in the tracking mode as previously stated above.

If the frequency estimation mode is not equal to the tracking mode at step S10, the SFO calculator 50 receives the estimated phase $\angle x'_{l,k_n}$, and stores the received phase $\angle x'_{l,k_n}$ in an internal buffer as denoted by $\Phi_{l,n} = \angle x'_{l,k_n}$, at step S20.

If the frequency estimation mode is determined to be the tracking mode at step S10, the SFO calculator 50 compares the estimated phase $\angle x'_{l,k_n}$, with the magnitude of a predetermined input standard deviation $\sigma_{ph}$ at step S30. It is preferable that the magnitude of the standard deviation $\sigma_{ph}$ is 0.5 rad. In this case, the standard deviation $\sigma_{ph}$ is experimentally calculated.

If the magnitude of the estimated phase $\angle x'_{l,k_n}$ is greater than the magnitude of input standard deviation $\sigma_{ph}$ at step S30, the SFO calculator 50 determines that overshoot occurs by the deep fading in the tracking mode, such that it compulsorily sets the estimated phase to zero.

The above-mentioned operation is called a zero-focusing operation. In other words, the estimated phase is compulsorily set to zero, and the resultant phase is stored in a buffer of the SFO calculator 50 as denoted by $\Phi_{l,n}=0$ at step S40.

If the magnitude of the estimated phase is equal to or less than the magnitude of the standard deviation, the estimated phase is stored in the buffer as denoted by $\Phi_{l,n}=\angle x'_{l,k_n}$ at step S50.

Thereafter, a slope between phase data units, i.e., an SFO denoted by a specific character "$\zeta$", is calculated using the above-mentioned stored phase values at step S60. In other words, the SFO calculator 50 calculates a slope among 45 pilot phases in the 2 k mode, and calculates a slope among 177 pilot phases in the 8 k mode as denoted by the following equation 2:

$$\Delta\phi_{l,n} = \phi_{l,n} - \phi_{l,n-1} \quad \text{[Equation 2]}$$

$$\Delta k_n = k_n - k_{n-K}$$

$$\zeta = \frac{1}{2\pi(1+Ng/N)} \sum \frac{\Delta\phi_n}{\Delta k_n},$$

wherein $\zeta$ is the calculated SFO.

In the case of calculating the SFO using the above-mentioned method, a phase overshoot caused by a ghost is zero-forced, such that the SFO can be correctly estimated even in the tracking mode.

If the estimated SFO value is higher than a predetermined value of 400 ppm in the 2 k mode, or is higher than a predetermined value of 100 ppm in the 8 k mode, pilot phase information units of both ends are inverted from each other, such that it is difficult to estimate a correct SFO value. In order to solve the above-mentioned problem, there has been used a method shown in FIG. 6.

Figure 6:
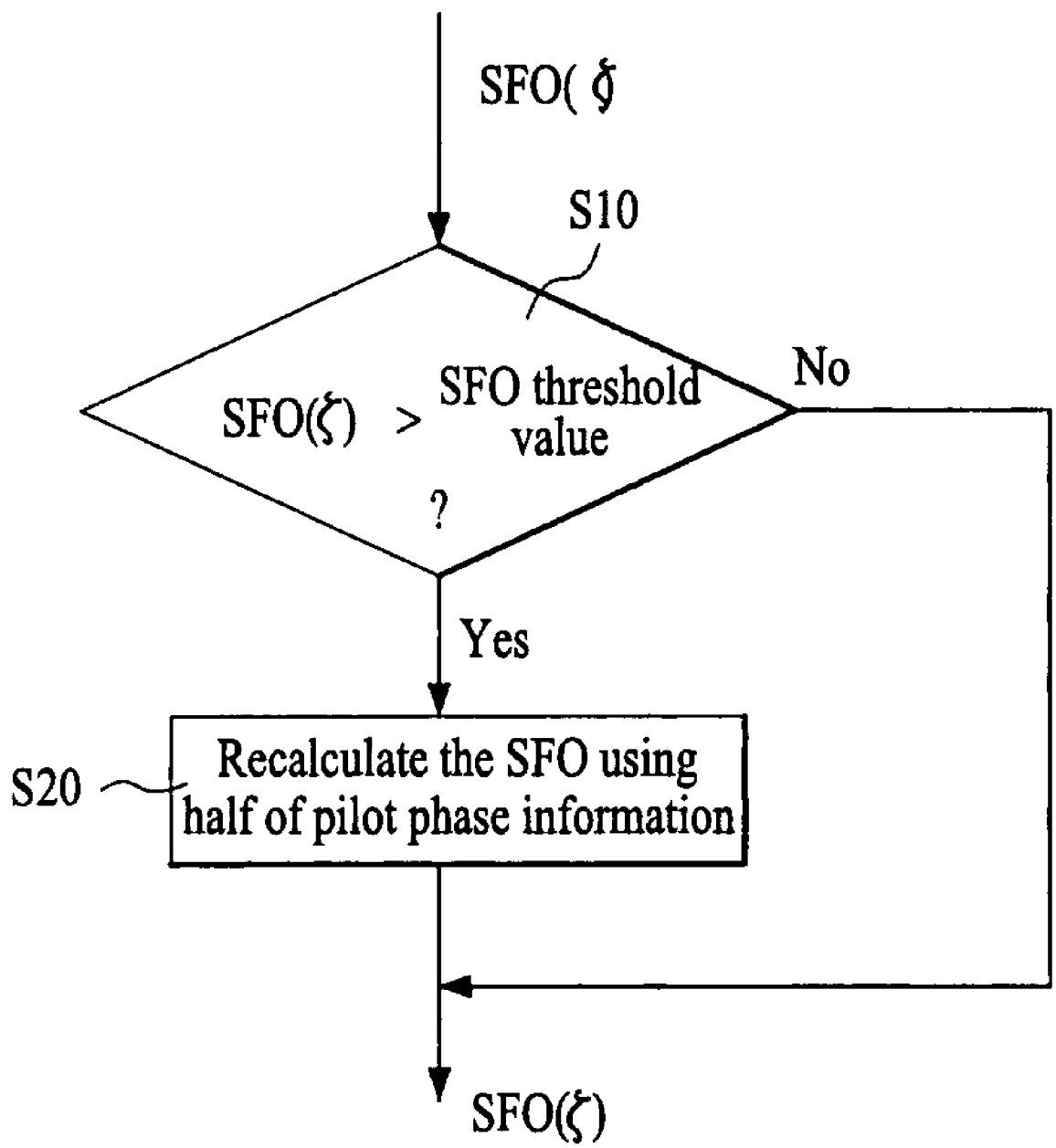
FIG. 6 is a flow chart illustrating an algorithm for estimating an SFO of more than 400 ppm in the 2 k mode or an SFO of more than 100 ppm in the 8 k mode according to the present invention.

FIG. 6 is a flow chart illustrating an algorithm for estimating an SFO of more than 400 ppm in the 2 k mode or an SFO of more than 100 ppm in the 8 k mode according to the present invention.

Referring to FIG. 6, the SFO calculator 50 receives the calculated SFO $\zeta$, and determines whether the received SFO value $\zeta$ is higher than an SFO threshold value at step S10. In this case, the SFO threshold value is indicative of a specific value of more than 400 ppm in the 2 k mode, and is indicative of a specific value of more than 100 ppm in the 8 k mode, as denoted by the following equation 3:

$$SFO \text{ threshold value} = \frac{1}{N_{sub}(1+Ng/N)} \quad \text{[Equation 3]}$$

If the calculated SFO value $\zeta$ is higher than the SFO threshold value at step S10, the SFO calculator 50 discards the pilot phase information units of both ends, and re-calculates the SFO value using only a half the pilot phase information at step S20. The above-mentioned calculation process can be represented by the following equation 4:

$$\Delta\phi_{l,n} = \phi_{l,n} - \phi_{l,n-[K/2]} \quad \text{[Equation 4]}$$

$$\Delta k_n = k_n - k_{n-[K-2]}$$

$$\zeta' = \frac{1}{2\pi(1+Ng/N)} \sum_{n=[K/2]}^{2[K/2]-1} \frac{\Delta\phi_n}{\Delta k_n},$$

wherein $\zeta'$ is the re-calculated SFO.

Needless to say, if the calculated SFO value $\zeta$ is equal to or less than the SFO threshold value, the SFO calculator 50 uses the calculated SFO value $\zeta$ without any change.

Figure 7:
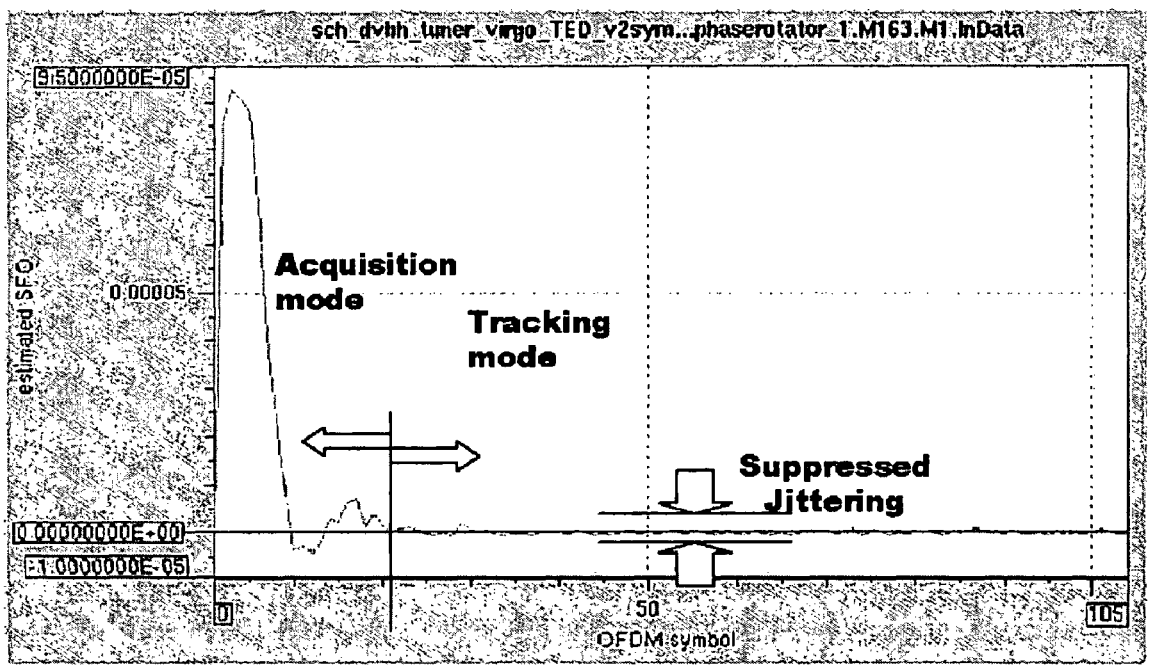
FIG. 7 shows a variation in SFO values estimated by an SFO estimation algorithm according to the present invention.

FIG. 7 shows a variation in SFO values estimated by an SFO estimation algorithm according to the present invention.

Figure 4:
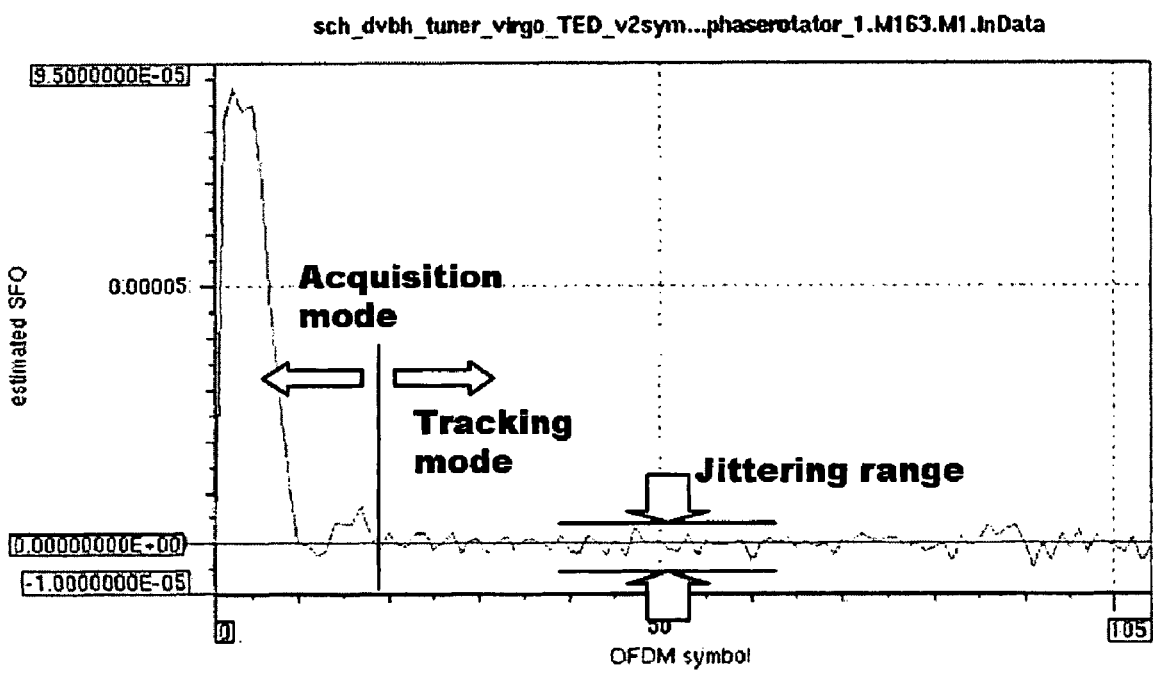
FIG. 4 shows a plurality of SFO values estimated in acquisition and tracking modes of the sampling frequency.

As shown in FIG. 7, it can be recognized that the jittering range is relatively reduced in the tracking mode on the condition that the SFO estimation algorithm is employed as compared to the graph shown in FIG. 4. The reduction of the jittering range in the tracking mode is equal to the ISI reduction of the reception signal, and is indicative of no constellation rotation.

Figure 8:
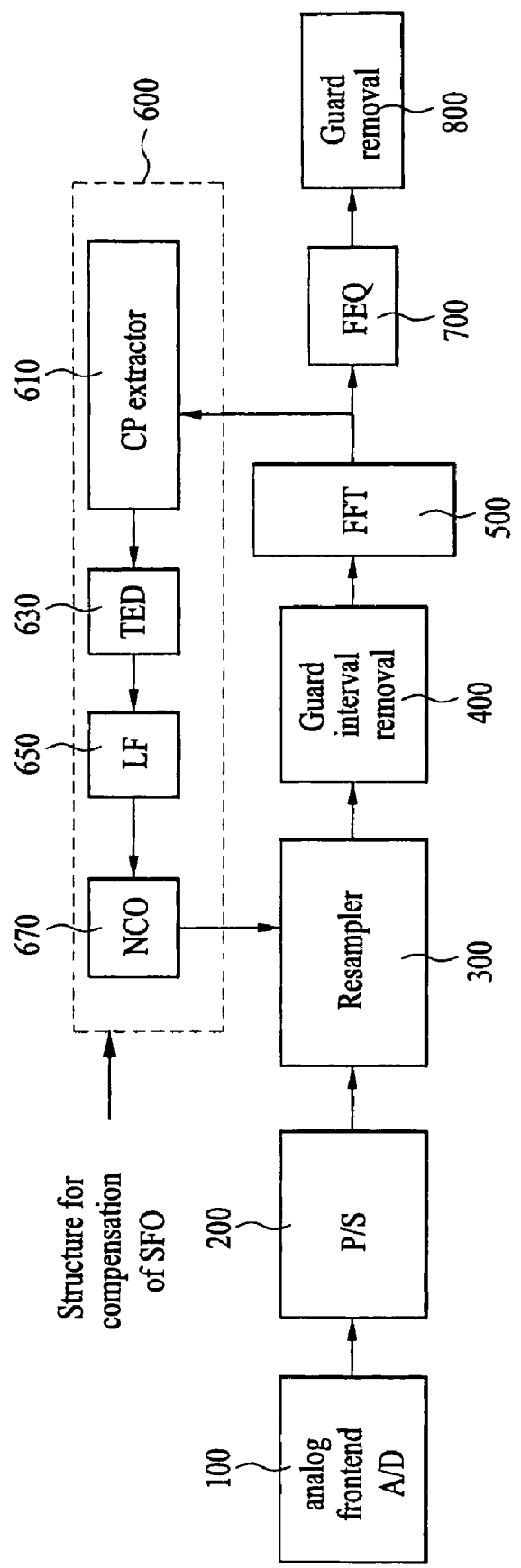
FIG. 8 is a block diagram illustrating an OFDM receiver according to the present invention.

FIG. 8 is a block diagram illustrating an OFDM receiver according to the present invention.

Referring to FIG. 8, the OFDM receiver includes an analog front-end and ADC (Analog-to-Digital Converter) unit 100, a P/S (Parallel-to-Serial) unit 200, a resampler 300, a guard interval removal unit 400, an FFT (Fast Fourier Transform) unit 500, and SFO compensator 600, an FEQ (Freuqency-domain Equalizer) unit 700, and a guard removal unit 800. In more detail, the analog front-end and ADC unit 100 performs a front-end process on a received analog signal, and converts the received analog signal into a digital signal. The P/S unit 200 converts a received parallel signal into a serial signal. The resampler 300 performs a sampling process on a received signal using the sampling frequency generated by the estimated SFO. The guard interval removal unit 400 removes a guard interval of the received signal from a time domain. The FFT unit 500 converts a time-domain signal into a frequency-domain signal. The SFO compensator 600 performs correct sampling synchronization on the frequency-domain signal acting as the output signal of the FFT unit 500. The FEQ 700 performs channel equalization in a frequency domain. The guard remover unit 800 removes a guard interval from the frequency domain.

Particularly, the SFO compensator 600 according to the present invention includes a CP extractor 610 for extracting a CP signal from the frequency-domain signal; a timing error detector 630 for receiving the extracted CP signal, and calculating a timing error value equal to the SFO value $\zeta$ using the extraction algorithm of the present invention; a loop filter (L/F) 650 for receiving the SFO value $\zeta$, and accumulatively compensating for the received SFO value $\zeta$, and a numerical controlled oscillator (NCO) 670 for controlling a sampling frequency upon receiving the corrected SFO value $\zeta$ from the L/F 650.

Therefore, the resampler 300 performs the sampling process using the resultant SFO value correctly estimated by the above-mentioned inventive method, such that correct sampling synchronization is provided.

In the meantime, the present invention is applicable to a DVB-T receiver and a DVB-H receiver.

As apparent from the above description, a method for estimating an SFO in a digital receiver, and an apparatus for compensating for a sampling frequency using the estimated SFO have the following effects.

Firstly, a phase overshoot caused by a ghost is zero-forced (i.e., the phase overshoot is set to zero), such that a correct SFO can be estimated in the tracking mode.

Secondly, the SFO value can be correctly estimated although the estimated SFO is transitioned to 400 ppm in the 2 k mode or 100 ppm in the 8 k mode.

Thirdly, in the case of employing the correctly-estimated SFO value, the sampling frequency can be effectively compensated in the digital receiver.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for estimating a Sampling Frequency Offset (SFO) in a digital receiver in order to perform sampling synchronization, the method comprising:
   receiving an estimated phase and comparing a magnitude of the received estimated phase to a predetermined standard deviation;
   storing an estimated phase of zero if the magnitude of the received estimated phase is greater than the predetermined standard deviation;
   storing the received estimated phase if the magnitude of the received estimated phase is less than or equal to the predetermined standard deviation;
   calculating an SFO value by calculating a slope between individual data units of the stored estimated phase; and
   re-calculating the SFO value using a half pilot phase information if the calculated SFO value is greater than an input SFO threshold value.

2. The method according to claim 1, wherein the estimated phase is determined using Continual Pilot (CP) information contained in a transmitted Orthogonal Frequency Division Multiplexing (OFDM) symbol.

3. The method according to claim 1, wherein comparing the magnitude of the received estimated phase to the predetermined standard deviation is performed when a current frequency estimation mode is equal to a tracking mode.

4. The method according to claim 3, further comprising storing the received estimated phase in a buffer if the frequency estimation mode is not equal to the tracking mode.

5. The method according to claim 1, wherein the predetermined standard deviation is 0.5 rad.

6. The method according to claim 1, wherein calculating the SFO value comprises calculating a mean value of the calculated slope.

7. A method for estimating a Sampling Frequency Offset (SFO) in a digital receiver in order to perform sampling synchronization, the method comprising:
   receiving an estimated phase and comparing a magnitude of the received estimated phase to a predetermined standard deviation;
   storing an estimated phase of zero if the magnitude of the received estimated phase is greater than the predetermined standard deviation;
   storing the received estimated phase if the magnitude of the received estimated phase is less than or equal to the predetermined standard deviation;
   calculating an SFO value using the stored estimated phase;
   comparing the calculated SFO value to an input SFO threshold value; and
   re-calculating the SFO value using only a half pilot phase information if the calculated SFO value is greater than the SFO threshold value.

8. The method according to claim 7, wherein the half pilot phase information does not include both-end information of an inverted pilot phase.

9. The method according to claim 7, further comprising not re-calculating the SFO value if the calculated SFO value is less than the SFO threshold value.

10. The method according to claim 7, wherein the SFO threshold value is 400 ppm in a 2 k mode.

11. The method according to claim 7, wherein the SFO threshold value is 100 ppm in an 8 k mode.

12. A method for estimating a sampling frequency offset (SFO) in a digital receiver to perform sampling synchronization, comprising the steps of:
   receiving an estimated phase, and determining whether a current frequency estimation mode is a tracking mode;
   if the current frequency estimation mode is the tracking mode, comparing a magnitude of the estimated phase with that of a predetermined standard deviation;
   if the magnitude of the estimated phase is greater than that of the predetermined standard deviation, compulsorily setting the estimated phase to zero, and storing the estimated phase of zero;
   if the magnitude of the received estimated phase is less than or equal to the predetermined standard deviation, storing the received estimated phase;
   calculating an SFO value using the stored phase;
   receiving the calculated SFO value, and comparing the received SFO value with an input SFO threshold value; and
   if the calculated SFO value is higher than the SFO threshold value, re-calculating the SFO value using only a half pilot phase information.

13. An apparatus for estimating a Sampling Frequency Offset (SFO) in a digital receiver in order to perform sampling synchronization, the apparatus comprising:
   a phase estimator for receiving phase information and generating an estimated phase; and
   an SFO calculator for comparing a magnitude of the estimated phase to a predetermined standard deviation, storing an estimated phase of zero if the magnitude of the estimated phase is greater than the predetermined standard deviation, storing the received estimated phase if the estimated phase is less than or equal to the predetermined standard deviation, calculating an SFO value by calculating a slope between individual data units of the stored estimated phase and re-calculating the SFO value using a half pilot phase information if the calculated SFO value is greater than an input SFO threshold value.

14. The apparatus according to claim 13, wherein the SFO threshold value is a predetermined threshold value.

15. The apparatus according to claim 14, wherein the SFO threshold value is 400 ppm in a 2 k mode.

16. The apparatus according to claim 14, wherein the SFO threshold value is 100 ppm in an 8 k mode.

17. The apparatus according to claim 13, wherein the predetermined standard deviation is 0.5 rad.

18. A method for compensating for a sampling frequency in a digital receiver, the method comprising:
   extracting Continual Pilot (CP) information from a transmitted Orthogonal Frequency Division Multiplexing (OFDM) symbol;
   estimating a phase using the extracted CP information, setting the estimated phase to zero if a magnitude of the estimated phase is greater than a predetermined standard deviation and storing the set estimated phase of zero, storing the received estimated phase if the magnitude of the received estimated phase is less than or equal to the predetermined standard deviation, calculating a Sampling Frequency Offset (SFO) value using the stored estimated phase, and re-calculating the SFO value using only a half pilot phase if the calculated SFO value is greater than a predetermined threshold value;

accumulatively compensating for the calculated SFO value; and outputting a signal for controlling a sampling frequency using the accumulatively-compensated SFO value.

19. An apparatus for compensating for a sampling frequency in a digital receiver, the apparatus comprising:
- a Continual Pilot (CP) extractor for extracting CP information from a transmitted Orthogonal Frequency Division Multiplexing (OFDM) symbol;
- a timing error detector for estimating a phase using the extracted CP information, setting the estimated phase to zero if a magnitude of the estimated phase is greater than a predetermined standard deviation and storing the set estimated phase of zero, storing the received estimated phase if the magnitude of the received estimated phase is less than or equal to the predetermined standard deviation, calculating a Sampling Frequency Offset (SFO) value using the stored estimated phase, and re-calculating the SFO value using only a half pilot phase if the calculated SFO value is greater than a predetermined threshold value;
- a loop filter (L/F) for accumulatively compensating for the calculated SFO value; and
- a numerical controlled oscillator (NCO) for controlling a sampling frequency upon receiving the accumulatively-compensated SFO value.

* * * * *